US011198985B2

(12) United States Patent
Badenberg et al.

(10) Patent No.: US 11,198,985 B2
(45) Date of Patent: Dec. 14, 2021

(54) METHOD FOR MONITORING MOVEMENT OF A CANTILEVER STRUCTURE OF AN OFFSHORE PLATFORM, MONITORING SYSTEM, OFFSHORE PLATFORM

(71) Applicant: GustoMSC Resources B.V., Schiedam (NL)

(72) Inventors: Theodorus Wilhelmus Maria Badenberg, Schiedam (NL); René De Bruijn, Schiedam (NL)

(73) Assignee: GUSTOMSC B.V., Schiedam (NL)

( * ) Notice: Subject to any disclaimer, the term of this patent is extended or adjusted under 35 U.S.C. 154(b) by 0 days.

(21) Appl. No.: 16/492,007

(22) PCT Filed: Mar. 12, 2018

(86) PCT No.: PCT/NL2018/050152
§ 371 (c)(1),
(2) Date: Sep. 6, 2019

(87) PCT Pub. No.: WO2018/164581
PCT Pub. Date: Sep. 13, 2018

(65) Prior Publication Data
US 2020/0378083 A1    Dec. 3, 2020

(30) Foreign Application Priority Data
Mar. 10, 2017   (NL) ..................... 2018499

(51) Int. Cl.
*E02B 17/02*   (2006.01)
*E21B 15/00*   (2006.01)
(Continued)

(52) U.S. Cl.
CPC .......... *E02B 17/021* (2013.01); *E21B 15/003* (2013.01); *E02B 2017/006* (2013.01); *E02B 2017/0039* (2013.01); *G06T 7/73* (2017.01)

(58) Field of Classification Search
CPC ............ E02B 17/021; E02B 2017/006; E02B 2017/0039; E02B 17/00; E21B 15/003;
(Continued)

(56) References Cited

U.S. PATENT DOCUMENTS 3,753,552 A * 8/1973 Barron ..................... B66D 1/52
254/270
3,763,808 A * 10/1973 Smith, Sr. ............... B63B 35/38
114/266

(Continued)

FOREIGN PATENT DOCUMENTS

EP          2993620 A1     3/2016

OTHER PUBLICATIONS

Jun. 11, 2018, International Search Report and Written Opinion, PCT/NL2018/050152.

*Primary Examiner* — Edwin J Toledo-Duran
(74) *Attorney, Agent, or Firm* — Banner & Witcoff, Ltd.

(57) ABSTRACT

A method for monitoring movement of a cantilever structure of an offshore platform, such as a jack-up platform or a self-elevating vessel, comprising providing a boundary model containing boundary limiting information of positions of the cantilever structure, wherein the boundary limiting information comprises at least position information of boundary limiting elements, such as obstacles; providing, during movement of the cantilever, position information of the cantilever representing an actual position of the cantilever; determining, during movement of the cantilever, a difference between the cantilever position information and the boundary limiting information of the boundary model; providing an output signal when the determined difference exceeds a predefined threshold value.

31 Claims, 3 Drawing Sheets

(51) Int. Cl.
*G06T 7/73* (2017.01)
*E02B 17/00* (2006.01)

(58) Field of Classification Search
CPC .. G06T 7/73; B63B 9/00; B63B 9/065; B63B 2009/005; B63B 2009/067; F03D 9/43; F03D 13/25
USPC .................................................. 405/196–200
See application file for complete search history.

(56) References Cited

U.S. PATENT DOCUMENTS

| | | | | |
|---|---|---|---|---|
| 4,516,882 A | * | 5/1985 | Brewer | B63B 21/502 |
| | | | | 114/265 |
| 6,808,337 B1 | * | 10/2004 | Thomsen | B63B 21/50 |
| | | | | 114/264 |
| 8,070,388 B2 | * | 12/2011 | Thomas | E02B 17/021 |
| | | | | 405/203 |
| 9,695,565 B2 | * | 7/2017 | Maini | B66C 7/00 |
| 10,294,626 B2 | * | 5/2019 | Jimeno Chueca | E02D 27/425 |
| 10,337,258 B2 | * | 7/2019 | Dowdy | E02B 17/00 |
| 2004/0060739 A1 | * | 4/2004 | Kadaster | E02B 17/00 |
| | | | | 175/57 |
| 2005/0092226 A1 | * | 5/2005 | Gehring | B63B 21/50 |
| | | | | 114/264 |
| 2008/0131209 A1 | * | 6/2008 | Thomas | B63B 35/003 |
| | | | | 405/198 |
| 2012/0027523 A1 | * | 2/2012 | Vanderbeke | E02B 17/021 |
| | | | | 405/195.1 |
| 2015/0259037 A1 | * | 9/2015 | Eriksen | B63B 71/00 |
| | | | | 414/138.1 |
| 2015/0361965 A1 | * | 12/2015 | Jimeno Chueca | F03D 13/22 |
| | | | | 405/200 |
| 2017/0152713 A1 | * | 6/2017 | Dowdy | E21B 15/02 |
| 2018/0223493 A1 | * | 8/2018 | Maini | E02B 17/0836 |

* cited by examiner

METHOD FOR MONITORING MOVEMENT OF A CANTILEVER STRUCTURE OF AN OFFSHORE PLATFORM, MONITORING SYSTEM, OFFSHORE PLATFORM

CROSS-REFERENCE TO RELATED APPLICATIONS

This application is a U.S. National Stage application under 35 U.S.C. § 371 of International Application PCT/NL2018/050152 (published as WO 2018/164581 A1), filed Mar. 12, 2018, which claims the benefit of priority to Application NL 2018499, filed Mar. 10, 2017. Benefit of the filing date of these prior applications is hereby claimed. Each of these prior applications is hereby incorporated by reference in its entirety.

FIELD OF THE INVENTION

The invention relates to a method of monitoring movement of a cantilever structure of an offshore platform, such as a jack-up platform or a self-elevating vessel or a semi-submersible, and to a system for monitoring movement of a cantilever structure and to a control unit configured for carrying out such a method.

BACKGROUND TO THE INVENTION

Mobile offshore platforms can for example be operated to drill for hydrocarbons or to install offshore structures. For chilling operations, a drilling floor and drilling derrick are usually placed on an end of a cantilever structure such that when the cantilever structure is retracted, the drill floor and the derrick are substantially within the bounds of the floating platform, for example in the form of a buoyant hull. In this configuration the platform can be moved from one drilling location to another, usually by being towed, or, in some embodiment, self-propelled.

Once on location, for instance, when utilizing a jack-up platform for chilling purposes, the platform is elevated above the sea level such that it is generally clear from waves. This can be done typically by lowering legs of the jack-up platform to the seabed and jacking up the platform along the legs which are then supported by the seabed. Next, the cantilever structure can be extended out of the platform, such that the drilling center is outside the platform and a well can be approached and/or drilled and constructed in that position. This can be over open water or over a fixed structure positioned on the seabed.

In particular when drilling over an existing fixed structure resting on the seabed, such as a jacket, reaching various well positions involves movement of the cantilever structure relative to the platform for maneuvering the cantilever structure, and thus the drilling derrick on it, from one well to another. Movement of the cantilever structure can be in X-direction, or in XY-direction, or in X-psi direction, or any combination thereof.

Free space on an offshore platform is typically limited due to the presence of e.g. legs, cranes and other equipment and/or accommodation projecting upwardly from or arranged on top of the platform.

Transverse displacement of the cantilever structure may for instance be limited by the transverse spacing between for instance the legs, typically the aft legs, or by other permanent or temporary obstacles on the platform. Such obstacles can for example be auxiliary equipment, supplies, a crane or even a load hanging from a crane.

Longitudinal displacement of the cantilever structure may also be limited by such permanent or temporary obstacles due to the irregular outline of the cantilever. When the cantilever is positioned close to an obstacle at a side, structural parts or equipment projecting from the cantilever may collide with that obstacle during longitudinal displacement.

In practice, movement of the cantilever is controlled by an operator in charge of the movement of the cantilever. However, often, the operator has limited or no visual contact with, parts of, the cantilever and/or the platform. Therefore, personnel is often used to survey the movement operation of the cantilever to avoid that the cantilever collides with a part of the platform or with an obstacle on the platform. Prevention of collision is important as a collision may result in substantial damage and/or danger, as well as may result in additional costs due to repair and/or downtime. However, since movement of a cantilever typically occurs at relatively low speeds, watching over the movement of the cantilever is a time consuming task and prone to human error. Also, to watch over the operation of the cantilever, personnel often is positioned at relatively hazardous areas.

GENERAL DESCRIPTION

It is an object of the present invention to provide a method that obviates at least one of the above mentioned drawbacks. In particular, it is aimed to reduce the risk of moving a cantilever against a part of the platform or against an obstacle on the platform.

According to the invention, this object is achieved by providing a method according to claim 1.

By providing a boundary model containing boundary limiting information and by determining the actual position of the cantilever during movement, and comparing this position with the boundary model, the movement of the cantilever can be monitored. By determining a difference between the actual position and the boundary limiting information, the movement of the cantilever can be followed in relation to the boundary model. The boundary model preferably comprises boundary limiting information determined by the actuation system of the cantilever defining the extreme positions that the cantilever can be moved to, a so-called base outline or base map of the possible cantilever movement envelope. In addition, the boundary limiting information comprises information about positions of boundary limiting elements, such as obstacles. These obstacles can be permanent or temporary structures on the platform deck, e.g. adjacent or in the surroundings of the cantilever. The obstacles can also be permanent or temporary structures on or at the cantilever, e.g. a mobile or detachable crane or a secondary cantilever etc. All these obstacles can limit the operational envelope of the cantilever structure as collision may occur.

By providing such a boundary model in which such information is obtained, the operator now has an overview of the actual operational envelope of the cantilever, in which he can move the cantilever. This is a major advantage compared to the conventional situation in which usually this information is not available at all and the operator needs to move the cantilever based on experience and reliable communication. The boundary model advantageously defines an operational envelope in which the cantilever structure can safely move. The boundary limiting information involves information, in particular position information, that affects the boundary of the boundary model.

Advantageously, this information is presented to the operator on an interface which he can easily consult. The interface can be a screen in the operator cabin or an application on a mobile communications device etc.

When the difference between the actual position information of the cantilever and the boundary limiting information exceeds a predefined threshold value, typically when the cantilever position information is too close to the boundary limiting information, output information can be generated, preferably to the operator, e.g. to warn the operator that the cantilever is approaching a limit of its operational envelope. The output information can be an audible or a visual feedback to the operator, e.g. by means of a warning light or a warning horn. Also, the output information can be presented on the interface as well. The operator can then decide how he wants to interrupt the operations. In a more advanced embodiment, the output information can be fed to the actuation system to slow down or interrupt the actuation operation.

The predefined threshold value can be zero or different from zero. The predefined threshold value can be set by the operator, and can thus be adaptable, or can be set by the constructor of the cantilever and cantilever actuation system as a machine parameter. The predefined threshold value in fact provides for a safety zone in which the cantilever operation may be stopped to avoid collision. Alternatively and/or additionally, the speed of the movement of the cantilever structure may be slowed down when approaching the threshold value and/or when approaching the boundary limit of the boundary model.

The boundary model preferably is incorporated as a two-dimensional or three-dimensional map containing position information in a respective coordinate system. The coordinate system can be a Cartesian, polar or any other suitable coordinate system. Advantageously, the position information of the cantilever structure itself may include information about the dimensions of the cantilever structure. Alternatively, the dimensions of the cantilever may be provided in the boundary model as boundary limiting information. Or, also alternatively, the position information of the cantilever may comprise information of the position of a reference point of the cantilever. Dimensions of the cantilever extending out of the reference point may for example be incorporated in the threshold value. The reference point typically may be the well center of the cantilever. Many variants are possible.

Preferably, the boundary model is a dynamic model providing information about allowable positions or position ranges of the cantilever. The boundary limiting information may be dependent on the layout of the platform and/or on the obstacles positioned thereon.

Advantageously, the boundary limiting information comprises a fixed or permanent part and a dynamic or adaptable part. Typically, fixed or permanent boundary limiting information comprises information about permanent structures on the cantilever bearing structure, i.e. the platform, such as a crane foundation, a crane rest, jacking structures e.g. jack houses or the legs, and/or information about the dimensions of the cantilever structure itself, anchor also comprises the limitations of the movement system that provides for the movement of the cantilever, such as an XY-system or an x-psi system, e.g. the end of reach of the movement system. Permanent boundary limiting information may be pre-programmed, e.g. by entering coordinates manually or by recording limits during try out in 'as-built' situation, or may be generated automatically using known sensors for mapping the surroundings.

The adaptable boundary limiting information may be different for different operations, e.g. at different offshore sites, or different types of operations, e.g. drilling, maintenance, etc., and may e.g. dependent on temporary obstacles on the platform, such as containers or equipment. Also, information about the surroundings of the cantilever structure, which may be on the platform or outside the platform, e.g. an adjacent structure such as a well head supporting jacket, may be provided as boundary limiting information to the boundary model. Temporary boundary limiting information, e.g. temporary objects on the deck supporting the cantilever or equipment temporarily entering the allowable position range as determined according permanent boundary limiting information, may be entered manually on an interface or automatically using known sensors for obstacle recognition. Automatically gathered boundary limiting information may be refreshed regularly, for example real time, to keep the boundary model up-to-date during movement of the cantilever structure.

Providing the applicable boundary limiting information allows for a dynamic boundary model. This gives a large flexibility for the operator of the cantilever, and may enlarge the operational envelope compared to the conventional situation in which such information is not available.

Advantageously, at least one of the boundary limiting information is inputted to the boundary model prior to the movement of the cantilever to adapt the boundary model to the actual or current operational situation. For example, the fixed or permanent boundary limiting information may be permanently available in the boundary model, and the adaptable boundary limiting information may be inputted prior to the movement of the cantilever to reflect the actual or current situation in which the cantilever will be operated.

Inputting of boundary limiting information can be done either manually or automatically, for example via scanning of the surrounding environment and/or via scanning of boundary limiting elements. Via scanning of the surrounding environment, typically the environment near and/or adjacent to the cantilever, e.g. the deck of the self-elevating platform, or the jacket to be approached by the cantilever, or similar structures, possible boundary limiting elements can be detected. The scanning of the surrounding environment can be done with a detection system. Such detection system can comprise any kind of sensor able to detect distance and direction to objects, using various signals e.g. optical or sonical, such as image recognition, range detectors, such as LIDAR, ultrasound. Additionally, the detection system can comprise position sensors, such as an encoder, GPS transmitter or local beacon, or sensors for mapping the surroundings or any combination of suitable sensors. The scanned position information can be the position of at least an extreme end portion of the detected boundary limiting element. Scanning or sensing of the surrounding environment can be done prior to the movement of the cantilever structure to set the boundary model for the following movement operation, or can be done during the movement of the cantilever structure. When determining position information during movement of the cantilever structure an intermittent or even real time updating of the boundary model becomes possible. All such scanning or sensing arrangements or control unit may be integrated with the cantilever structure or the surrounding structure, preferably provided with robust housing and/or explosion proof rating.

Alternatively, the structures on the platform may be tagged with an information label, e.g. an RFID, which can be detected by the scanning apparatus. In such a case, the information contained in the tag may be transmitted to the scanning apparatus and/or to a control unit. The information contained in the tag, in particular, information about the position of the detected boundary limiting element, may be inputted automatically and/or directly into the boundary model. Alternatively, the position information of the detected element can be presented to the operator on an interface, after which the operator can decide whether to input the position information into the boundary model.

Also, during movement of the cantilever structure, the surrounding environment may be scanned and/or boundary limiting elements may be detected to determine whether a boundary limiting element may be temporary restricting the boundary limits of the cantilever structure movement, e.g. a movable crane of which a crane boom may be temporary limiting the movement of the cantilever structure. Thus, during movement, the boundary model may be updated with the scanned and/or detected boundary limiting information. Also, during movement, the actual position information of the cantilever structure may be updated into the boundary model.

The boundary limiting information of a boundary limiting element can comprise information on the horizontal and/or vertical position of an extreme portion of the boundary limiting element. Providing information about an extreme portion of the boundary limiting element, preferably of an extreme portion that is closest to the cantilever, may give a more accurate boundary model for the movement of the cantilever.

When the horizontal and/or vertical position information is available, the difference between the actual position information of the cantilever and the boundary limiting information can be determined in horizontal and/or vertical dimensions respectively.

Further, there can be provided a method for monitoring movement of a cantilever structure of an offshore platform, such as a jack-up platform or self-elevating vessel, comprising:
  prior to moving:
  providing a monitoring unit including a data processor with a memory containing a boundary model in computer readable and executable form for determining limitations of position ranges in accordance with boundary limiting information representing at least positions of boundary limiting structures, such as obstacles, and containing a threshold value;
  inputting boundary limiting information representing at least positions of boundary limiting structures into said memory;
  the data processor determining limitations of at least one position range from the inputted boundary limiting information in accordance with said boundary model;
  during movement:
  feeding position information representing the position of at least the cantilever into the data processor;
  the data processor calculating a difference between the position information and said limitations of the at least one position range; and
  in response to said difference being below the threshold value the data processor generating an output signal.

There can also be provided a control unit for monitoring movement of a cantilever structure of an offshore platform, such as a jack-up platform, comprising:
  a data processor with a memory containing a boundary model in computer readable and executable form for determining limitations of position ranges in accordance with boundary limiting information representing at least positions of boundary limiting elements and containing a threshold value;
  a boundary limiting information input interface for inputting boundary limiting information representing at least positions of portions of boundary limiting elements into said memory; and
  a position information input interface for inputting position information representing the current position of at least the cantilever along the cantilever guide into the data processor;
  wherein the data processor is arranged for:
  determining limitations of at least one position range from the inputted boundary limiting information in accordance with said boundary model;
  calculating a difference between the position information and said limitations of the at least one position range along the cantilever guide; and
  in response to said difference being below the threshold value the data processor, generating an output signal.

The invention further relates to a system for monitoring movement of a cantilever structure. By providing such a system, a collision prevention system can be arranged to monitor and/or control the movement of the cantilever structure on an offshore platform, such as a jack-up or self-elevating vessel.

The invention further relates to a control unit. The control unit may monitor that the cantilever structure outline and/or the cantilever reference point remains within the boundaries of the boundary model. The control unit may compare the current position and/or movement of the cantilever with the boundary model and may generate an output information such as an output signal when secure conditions are no longer present. Thereto, the control unit may receive position information from an input unit, e.g. an interface for manual input, or from a scanning or sensor arrangement. A threshold value may preferably be provided, which can be a settable safety margin, setting the distance from the cantilever to the boundary at which the control unit will generate a signal. When the cantilever enters this warning zone, the operator may be alerted and/or advised to intervene, e.g. by visual or audible signal or message. The operator may then decide how to proceed. Alternatively, the control unit may intervene operations and/or stop movement or reduce the speed while awaiting further instructions. At the boundary, the control unit preferably automatically executes a controlled stop or an emergency stop of the cantilever in order not to exceed the boundary of the boundary model. Alternatively, there may be multiple threshold levels, e.g. subsequent zones with increasing danger levels.

An interface may be provided that may show the current position of a reference point and/or of the outline of the cantilever structure on a suitable representation of the boundary model. The reference point may be for example the drilling position or well center, the outline of the cantilever structure may represent the outer sides of the cantilever structure. The representation of the boundary model may contain a map of the surrounding structures and/or objects or may be transformed to some topological format. Boundary limiting information or permanent boundary limiting information may be set by the operator, e.g. by inputting coordinates or by activating areas in a grid e.g. on a touch screen interface.

In case the cantilever outline changes in time, due to structural adaptations or equipment temporarily attached to the cantilever e.g. an auxiliary crane or a secondary cantilever, the interface can be used to set or input the permanent or temporary dimensions of the cantilever to update the boundary model.

Temporary objects, such as equipment or supplies, placed within the secure boundaries of the boundary model may be added manually as an obstacle or may trigger an automatic response when the object is provided with a tracking device, e.g. a tag or transponder indicating position, orientation and/or volume. Peripheral equipment, such as a leg crane, which may intrude the allowable position range for the cantilever during operation may also be provided with such a tracking device triggering such an automatic response when crossing the boundary. An automatic response results in an update of the boundary model, e.g. blocking a certain area and preventing the cantilever from entering this sector.

The control unit may be arranged to receive a signal from said tracking device, to identify the signal to locate the source and to react accordingly by updating the boundary model. Alternatively, a scanning or sensing device may be provided that is arranged to receive information from such tracking devices or to actively scan the environment to detect such tracking device. The scanning device may then provide the detected position information to the control unit to update the boundary model prior or during movement of the cantilever structure.

The invention further relates to a computer program product and to an offshore platform.

Particular elaborations and embodiments of the invention are set forth in the dependent claims.

Further features, effects and details of the invention appear from the detailed description and the drawings.

DETAILED DESCRIPTION

Figure 1:
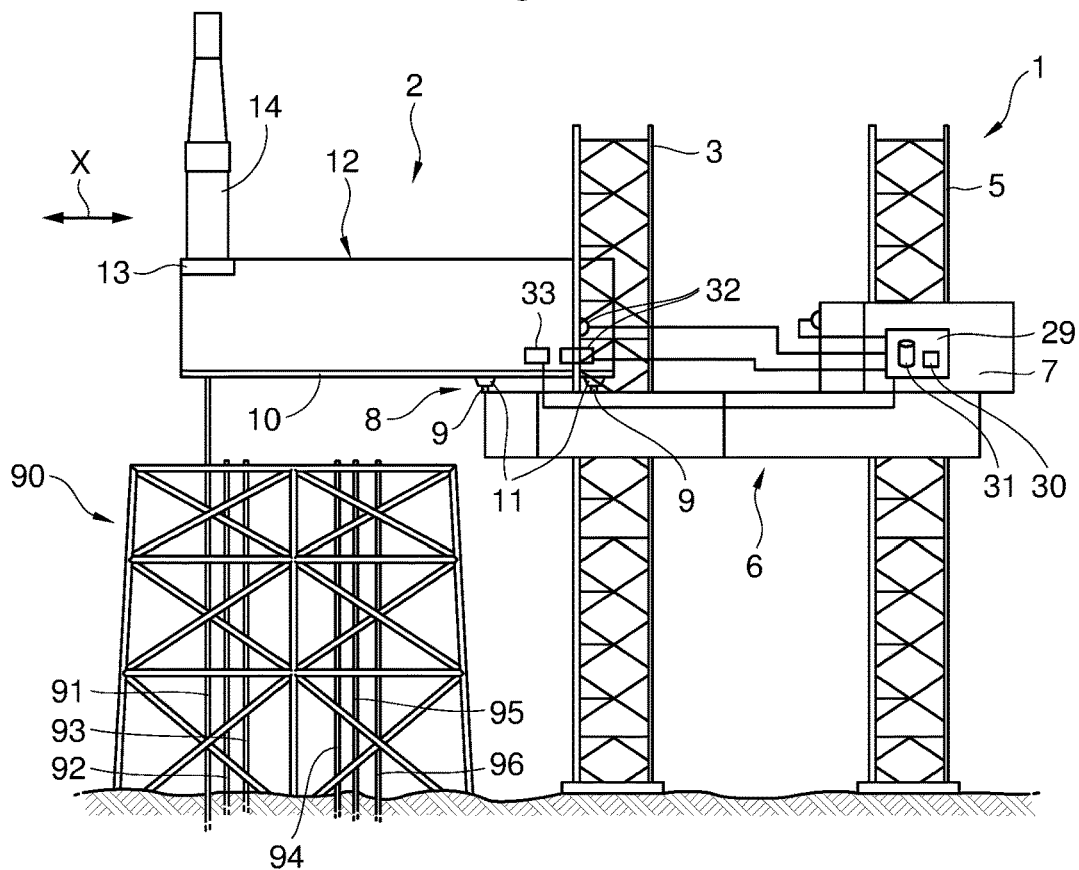
FIG. 1 is a schematic side view of an offshore platform with a first example of a cantilever structure according to the invention.

The invention is discussed with reference to FIGS. 1 and 2 which show an embodiment of an offshore platform in the form of a jack-up platform 1 with a cantilever structure 2 projecting substantially horizontally from a platform hull 6 of the jack-up platform 1. The jack-up platform 1 has three legs 3, 4, 5 carrying the platform hull 6, which is displaceable in vertical direction along the legs 3, 4, 5. Depending on various requirements, the number of legs may also be different, e.g. one, two, four, five, six or more legs. In this embodiment a cabin 7 accommodating control facilities, machinery and providing shelter or housing for a crew is arranged on the platform hull 6 at a side opposite of the side from which the cantilever structure 2 projects. The control facilities may also be positioned on the cantilever or as on the deck of the platform. The cantilever structure 2 is composed of a cantilever guide 8 and a cantilever 12 guided thereby.

The cantilever guide 8 is in the form of a skidding system having a fixed part in the form of transverse rails 9 fixedly mounted to the platform hull 6 of the jack-up platform 1 and a movable part 10, guided for guided movement relative to the fixed part 9. The movable part 10 of the cantilever guide 8 is formed by longitudinal rails 10 that are part of the elongated cantilever 12. In the present example two rails are provided, but other numbers of rails and/or other longitudinal guides and/or traction providing structures are also conceivable.

Support members 11 are guided by the rails 9 for guided displacement along the rails 9 so that the cantilever 12 is displaceable in substantially horizontal, transverse directions Y of the transverse rails 9, between extreme left and right positions, port and starboard positions. The cantilever 12 is guided to move over the support members 11 by its longitudinal rails 10 guided by the support members 11, along a trajectory in substantially horizontal longitudinal X direction between a most proximal position and a most distal position while the support members 11 are held stationary relative to the transverse rails 9. Displacement in other selected directions can be achieved by combination, simultaneous or sequential, of movement of the support members 11 along the transverse rails 9 and movement of the cantilever 12 with its longitudinal rails 10 over the support members 11. For examples of further details of support members and means for controlling displacements of the support members along the rails, reference is made to U.S. Pat. No. 6,171,027. The support members 11 may also be mutually connected forming a common intermediate member of the cantilever guide. In this example, a so-called XY-cantilever skidding system is used that allows movement of the cantilever 12 in longitudinal X and transverse Y direction. It is understood that other cantilever movement systems can be provided allowing movement in X-direction only, or allowing movement in X-Psi direction, so a combined longitudinal and angular movement. Many variants are possible.

The cantilever 12 projects from the fixed part 9 of the cantilever guide 8 and, in this example, has a drilling platform 13 carrying a drilling tower 14 at a distal end of the cantilever structure 2 for instance for performing drilling and other operations such as plugging wells 91-96 performed over a fixed platform 90. Instead of a drilling platform with a drilling tower or other rotary facilities, the cantilever structure may also carry a different well drilling or intervention facility, such as a crane or other equipment for performing operations such as well construction, maintenance, work over and/or plug and abandonment. The cantilever structure 2 may also comprise a secondary cantilever carrying any of said facilities.

Free space for the movement of the cantilever 12 can be limited due to the presence of boundary limiting elements, such as jack-up platform legs 3-5 including their related jacking houses and/or other items, such as accommodation housing 7, projecting upwardly from or arranged on top of the platform hull 6. Free space may also be limited by an adjacent fixed structure, such as fixed platform 90.

During transit and installation, the cantilever structure 2 is preferably retracted further inboard than in the distal position and sea-fastened. In the retracted position, the cantilever 12 and any facilities mounted thereto are preferably completely inboard of the platform, but a, preferably small, portion of the cantilever and/or of any facilities mounted thereto may still project outside of the platform 1.

Figure 2:
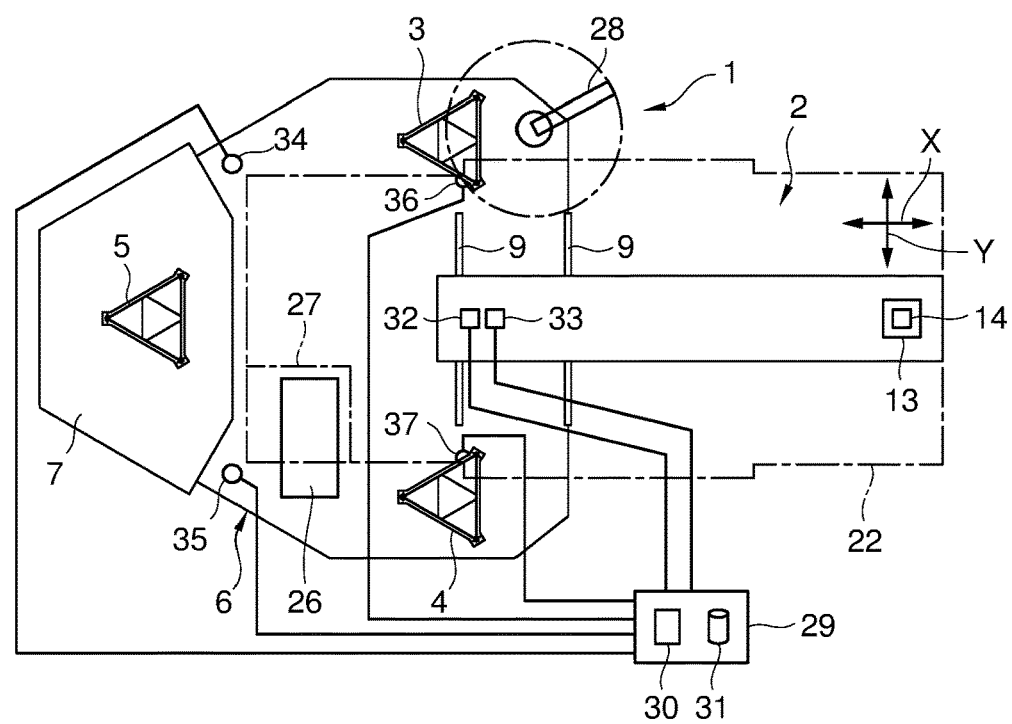
FIG. 2 is a schematic top plan view of the platform shown in FIG. 1.
Figure 3:
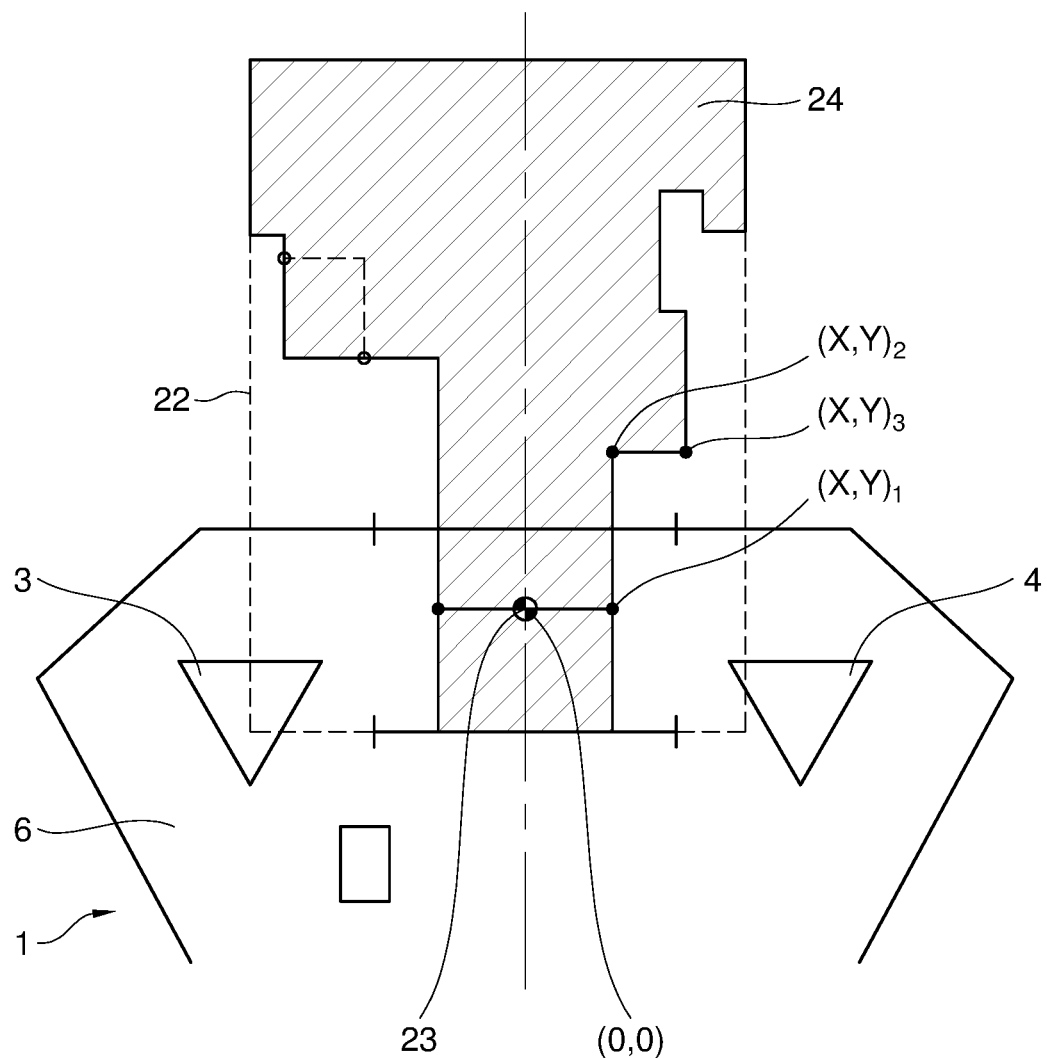
FIG. 3 shows an example of a boundary model.

In FIG. 2, a theoretical maximum operational envelope 22 in top plan view of the area potentially occupied by the cantilever structure 2 is shown. The theoretical maximum operational envelope 22 is determined by maximum reach of the movement system, such as the XY-skidding system of the embodiment of FIG. 1 and FIG. 2. Here, the boundary model contains only boundary limiting information about the maximum reach of the movement system, defining the boundaries of movement of the cantilever, resulting in the maximum theoretical operational envelope. In this embodiment, the maximum reach is therefore substantially rectangular, as shown for example in FIG. 3, as a dashed line. It is to be understood that the maximum operational envelope determined by the maximum reach of the movement system can have different shapes depending on the movement system. In FIG. 3, the platform 6 is schematically represented of which two legs 3, 4 are shown, the cantilever structure 2 itself is—for reasons of simplicity—not shown here. Instead, a reference point 23 of the cantilever 12 is shown. The reference point 23 can be for example the center of the drilling tower 14. As the movement of the cantilever 12 is often intended to bring the drilling tower 14 in a desired position, e.g. above a well center of a jacket platform 90, it is for the operator convenient to have the drilling tower 14 as the reference point. This may also be visualized as such onto the interface accessible for the operator. FIG. 3 shows an example of a cantilever reference point on a representation of the boundary model 24. The boundary model can be represented in a cartesian coordinate system or in a polar coordinate system in case of rotating cantilever. The representation can be certain reference coordinates, e.g. drilling center, among allowable positions, or a cantilever outline on a basemap showing surrounding or neighbouring structures. The representation of the boundary model can be with a grid and/or with sectors. Inputting of boundary limiting information can be done manually via an interface, or automatically by selecting a sector or inputting coordinates.

As can be seen from FIG. 2, portions of this maximum envelope 22 overlap with the rear legs 3, 4 of the platform 1. In some situations, the theoretical maximum envelope may also overlap the fixed platform 90. Thus, movement of the cantilever 2 without regard to limitations imposed by portions of the platform or obstacles on the platform could result in collision of the cantilever structure 2 to e.g. one of the legs 3, 4. In the present example, this is avoided by limiting the position range, i.e. the range of positions in which the cantilever can be moved, in Y-direction of the cantilever 12 when in or near its most retracted position. Thereto, the boundary model further contains boundary limiting information comprising at least position information of boundary limiting elements, such as legs, cranes, jackets etc. This boundary limiting information in fact reduces the maximum theoretical envelope, as can be seen e.g. in FIG. 3. In FIG. 3, the maximum theoretical envelope 22 is presented in broken line, the boundary model 24 containing the position information of boundary limiting elements is presented hatched. Thus, from adding the position information of boundary limiting elements, such as legs 3, 4, to the boundary model 24, the area in which the cantilever structure 2 can move becomes smaller compared to the boundary model containing only the maximum theoretical reach of the movement system. There are safety stops on the movement system, such that when the movement system approaches the end of its reach, it is either automatically stopped, or it abuts against a mechanical stop resulting in stopping of the movement. The operator itself often does not have an overview, or visual representation, of the position of the cantilever, as the visual contact with the cantilever is limited from his operator cabin. The operator typically operates the cantilever by visual inspection only, supported by people placed at strategic positions on deck to inform him of the process. Needless to say, that in such situations mistakes can easily happen. Therefore, providing an interface to the operator on which the position of the cantilever, e.g. a reference point thereof, with respect to the boundary model can be given, allows already for a more accurate operation of the cantilever.

Advantageously, a threshold value can be defined, wherein the threshold value represents a safety zone, in which e.g. the operator can be warned or the cantilever can be slowed down etc. The threshold value can be inputted by the operator, or can be set by the manufacturer of the movement system, or variants thereof. Also, the threshold value can be different for different movement directions, e.g. in case of an XY-movement system, the threshold value in X-direction may be different from the threshold value in Y-direction, and similar for an X-psi-movement system for which the threshold in X-direction can be different than the threshold value in angular psi-direction.

Boundary limiting elements, such as legs, cranes, etc., can be permanent, but can be temporary as well, e.g. a container or equipment. Advantageously, the boundary limiting information of the boundary limiting elements can be inputted to the boundary model to provide for a more accurate and up-to-date boundary model. Providing this boundary limiting information to the boundary model can be done prior to the movement of the cantilever, or can even be done during the movement of the cantilever, for example when the boom of a crane enters the boundary model, the position of the boom is preferably inputted to the boundary model to limit the possible range of movement of the cantilever there.

A further, temporary limitation of the position range can for instance result from the presence of a container 26 on the platform hull 6. Collision with the container 26 is avoided by restricting a set of forward positions to the port side of the cantilever. Yet another temporary restriction can for instance result from the position of a crane 28. While it is generally the responsibility of the crane operator to stay clear of the cantilever 2, operations to be performed may require that the full range of the crane 28 is left free. This again can be warranted by reducing limits of the position range.

Another possible limitation of the range of movement of the cantilever 12 may be provided by for example a crane attached to the side of the cantilever, or a secondary cantilever mounted on top of the cantilever, altering the outline of the cantilever.

Limitations of position ranges may also result from loads carried by the cantilever structure 2 as for instance registered by a load sensor 32. Current positions of the cantilever 12 along the respective cantilever guides 9 may for instance be registered using position sensors 33. It is to be understood that the load sensors and/or position sensors can have various positions on the cantilever.

Collisions with structures of the platform 1 or with obstacles on the platform hull 6 can be avoided by automatically monitoring the movement of the cantilever structure 2 using a control unit 29 including a data processor 30 with a memory 31 containing a boundary model in computer readable and executable form for determining limitations of position ranges of the cantilever in accordance with boundary limiting information representing at least positions of portions of boundary limiting elements of platform elements, such as legs 3, 4, or obstacles 26, 27, 28, cantilever load or cantilever structure configuration and containing a threshold value.

For determining limits of the position ranges, boundary limiting information is gathered, which represents at least positions of portions of platform elements or obstacles, cantilever load or cantilever structure configuration, inputted into a data processor 30 and stored in the memory 31. In addition to permanent boundary limiting information, temporary boundary limiting information may for instance be inputted manually on an interface, such as a human-machine interface (HMI) or may be detected by sensors. A scanning arrangement comprising scanners or sensors can be provided to detect boundary limiting elements.

For example, scanners 34-37 can be provided or position information can be received from a position indicator of e.g. crane 28. The sensor or scanning arrangement can provide at least a position indicator for providing reference coordinates of the cantilever, such as an encoder, linear transducer, GPS transmitter or a local beacon, and can optionally be provided with range scanners, optical scanners and/or position tracking sensors, e.g. on the cantilever, equipment, tag tracking detectors, e.g. RFID tag on temporary obstacles. In FIG. 2, the scanners or sensors 34-37 are positioned on the deck of the platform 6, alternatively and/or additionally, the scanners or sensors may be positioned on the cantilever structure 2.

The scanned boundary limiting information preferably includes scanned positions of at least an extreme end portions of each obstacle on the platform hull 6 that is in the theoretical envelope 22. The memory 31 holds a computer program in computer readable and executable form which, when loaded into the data processor 30, makes the data processor 30 suitable for carrying out the method according to the invention and according to the examples described below.

The boundary limiting information may be gathered realtime, which may involve a more or less constant delay or intermittent gathering with a given time interval, so that the temporary boundary limiting information is maintained current. Even if sensing obstacles is temporary impossible, e.g. due to averse weather conditions, the risk of collisions during skidding of the cantilever 2 is still reduced as the position ranges are based on the last available temporary boundary limiting information.

Figure 4:
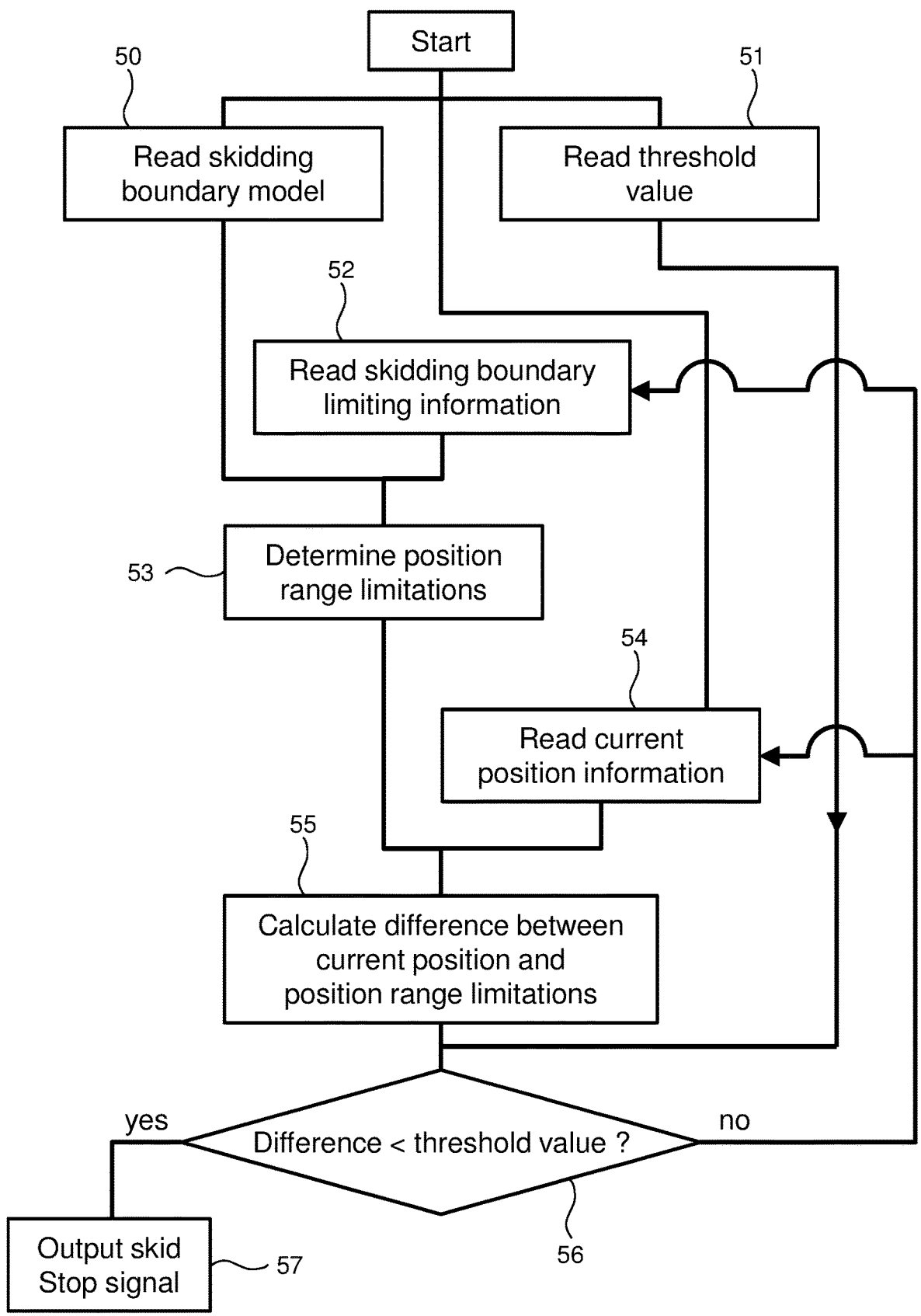
FIG. 4 is flow chart of an example of a method according to the invention.

As is illustrated in FIG. 4 by the flow chart of an example of an algorithm for carrying out the method according to the invention, after operation is started, first the boundary model is read (step 50) and the threshold value, which may be zero or allow for a safety margin, is read (step 51). A preliminary step that may be repeated after each operating cycle is reading the permanent and/or temporary boundary limiting information (step 52). In step 53, the data processor 30 determines limitations of the position ranges from the inputted boundary limiting information in accordance with the boundary model.

During movement of the cantilever, which is preferably blocked prior to completions of the above-described steps 50-53, position information representing the position of the cantilever 12 fed from the sensors 33 can be read (step 54).

The data processor 30 then calculates a difference between the position information and the combined limitations of the position ranges of the boundary model (step 55). If the difference exceeds the threshold value, in particular is below the threshold value (determination 56), the data processor 30 generates an output signal (step 57). The output signal may for instance be a warning signal for the operator, but can be a signal inputted into the skidding drive control so that speed is reduced or movement is automatically stopped. To avoid imparting shocks onto the cantilever structure 2, the stopping is preferably carried out smoothly.

The inputted boundary limiting information preferably also includes information on the vertical position of at least an extreme upper end portion of each obstacle on the platform hull 6 that is in the theoretical envelope 22. The calculation of a difference between the position information and the limitations of the at least one position range (step 55) preferably also includes calculating a vertical difference, the vertical difference being compared with a vertical threshold value. This allows parts of the cantilever structure 2 to be passed over low objects, which in top plan view are inside the theoretical envelope 22 of movement of the cantilever structure 2.

By providing that the boundary model preferably includes one or more relationship between limitations of position ranges and at least a position of an item carried by the cantilever, e.g. a secondary cantilever, or an auxiliary crane, use of at least a relatively large portion of the full range of movement without collision is made available.

Where parts are described as fixedly mounted, the mounting may be permanently fixed or removably or releasably fixed, the latter allowing dismounting or adjustment of the mounting position. In the retracted position, the cantilever structure may be fully retracted within a top plan view contour of the jack-up platform or project horizontally outside of that contour, but less far than in the distal position. Similarly, in the retracted position, the secondary cantilever may be fully retracted in the longitudinal direction relative to the primary cantilever or project horizontally in longitudinal direction beyond the primary cantilever, but less far than in the distal position.

For the purpose of clarity and a concise description, features are described herein as part of the same or separate embodiments, however, it will be appreciated that the scope of the invention may include embodiments having combinations of all or some of the features described. It may be understood that the embodiments shown have the same or similar components, apart from where they are described as being different.

Several features have been described as part of the same or separate embodiments. However, it will be appreciated that the scope of the invention also includes embodiments having combinations of all or some of these features other than the specific combinations of features embodied in the examples.

The invention claimed is:

1. A method for monitoring movement of a cantilever on an offshore platform, the method comprising:
   determining a boundary model that defines a spatial boundary of an actual operational envelope of movement of the cantilever or portion thereof,
   wherein the spatial boundary of the actual operational envelope corresponds to a larger spatial boundary of a maximum operational envelope of possible movement of the cantilever or portion thereof, said larger spatial boundary being limited by boundary limiting information defining positions of one or more boundary limiting elements on the offshore platform or on or at the cantilever, said one or more boundary limiting elements being at least partly within the maximum operational envelope;
   during movement of the cantilever, an actual position of the cantilever or portion thereof;
   determining, during movement of the cantilever, a difference between the actual position of the cantilever or portion thereof and the actual operational envelope of movement of the cantilever or portion thereof;
   providing an output signal when the difference is below a predefined threshold value, said output signal being indicative of a potential collision between the cantilever and said one or more boundary limiting elements.

2. The method according to claim 1, wherein the boundary limiting information is input, prior to movement of the cantilever.

3. The method according to claim 1, further comprising updating the boundary model during movement of the cantilever.

4. The method according to claim 1, further comprising scanning a surrounding environment of the cantilever and/or the offshore platform for the presence of said one or more boundary limiting elements.

5. The method according to claim 4, wherein said scanning provides position information of said one or more boundary limiting elements is as scanned position information.

6. The method according to claim 1, wherein the boundary limiting information includes position information of said one or more boundary limiting elements that comprises a horizontal position and/or a vertical position of an extreme portion of at least one of said one or more boundary limiting elements.

7. The method according to claim 6, wherein the difference between the actual position of the cantilever or portion thereof and the actual operational envelope is a difference from the horizontal position and/or the vertical position.

8. The method according to claim 1, wherein the boundary limiting information includes position information of said one or more boundary limiting elements that comprises at least a position of an extreme portion of a temporary obstacle.

9. A non-transitory computer readable medium for monitoring movement of a cantilever on an offshore platform, comprising a program of instructions for causing a processor to perform the steps of the method according to claim 1.

10. The method of claim 1, wherein the offshore platform is a jack-up platform or a self-elevating vessel.

11. The method of claim 1, wherein the boundary limiting elements are obstacles on the offshore platform or on or at the cantilever structure.

12. The method of claim 8, wherein the temporary obstacle is a movable crane.

13. The method of claim 1, wherein the spatial boundary is in the form of a two-dimensional or three-dimensional map.

14. The method of claim 1, wherein the portion of the cantilever is a reference point of the cantilever.

15. A system for monitoring movement of a cantilever structure on an offshore platform, the system comprising:
a control unit comprising a data processor and a non-transitory computer readable medium having stored thereon a boundary model, said boundary model defining a spatial boundary of an actual operational envelope of movement of the cantilever or portion thereof,
wherein the spatial boundary of the actual operational envelope corresponds to a larger spatial boundary of a maximum operational envelope of possible movement of the cantilever or portion thereof, said larger spatial boundary being limited by boundary limiting information defining positions of one or more boundary limiting elements on the offshore platform or on or at the cantilever, said one or more boundary limiting elements being at least partly within the maximum operational envelope;
wherein the control unit is configured for receiving, during movement of the cantilever, an actual position of the cantilever or portion thereof; and determining, during movement of the cantilever, a difference between the actual position of the cantilever or portion thereof and the actual operational envelope of movement of the cantilever or portion thereof;
wherein the control unit is further configured for generating output information when the difference is below a predefined threshold value;
an output unit for receiving the output information to generate an output signal, said output signal being indicative of a potential collision between the cantilever and said one or more boundary limiting elements.

16. The system according to claim 15, further comprising an input unit for inputting the boundary limiting information.

17. The system according to claim 16, further comprising an interface unit containing the input unit and/or the output unit.

18. The system according to claim 15, further comprising a scanning arrangement for providing position information of said one or more boundary limiting elements, said position information including at least an extreme end portion of at least one of said one or more boundary limiting elements.

19. The system according to claim 18, wherein the scanning arrangement is connected to the control unit for feeding the position information to the boundary model.

20. The system according to claim 15, wherein the computer readable medium includes a program of instructions that cause the control unit to perform any of the steps of:
determining the boundary model;
determining, during movement of the cantilever, the actual position of the cantilever or portion thereof;
determining, during movement of the cantilever, the difference between the actual position of the cantilever or portion thereof and the actual operational envelope of movement of the cantilever or portion thereof; and
providing the output signal when the difference is below the predefined threshold value.

21. An offshore platform comprising the system according to claim 15.

22. The system of claim 15, wherein the offshore platform is a jack-up platform or a self-elevating vessel.

23. The system of claim 15, wherein the boundary limiting elements are obstacles on the offshore platform or on or at the cantilever structure.

24. The system of claim 15, wherein the spatial boundary is in the form of a two-dimensional or three-dimensional map.

25. The system of claim 15, wherein the portion of the cantilever is a reference point of the cantilever.

26. A control unit comprising a data processor and a non-transitory computer readable medium having stored thereon a boundary model, said boundary model defining a spatial boundary of an actual operational envelope of movement of the cantilever or portion thereof,
wherein the spatial boundary of the actual operational envelope corresponds to a larger spatial boundary of a maximum operational envelope of possible movement of the cantilever or portion thereof, said larger spatial boundary being limited by boundary limiting information defining positions of one or more boundary limiting elements on the offshore platform or on or at the cantilever said one or more boundary limiting elements being at least partly within the maximum operational envelope;
wherein the control unit is configured for receiving, during movement of the cantilever, an actual position of the cantilever or portion thereof; and determining, during movement of the cantilever, a difference between the actual position information of the cantilever or portion thereof and the actual operational envelope of movement of the cantilever or portion thereof;
wherein the control unit is further configured for providing an output signal when the difference is below a predefined threshold value, said output signal being indicative of a potential collision between the cantilever and said one or more boundary limiting elements.

27. The control unit of claim 26, wherein the computer readable medium includes a program of instructions that cause the control unit to perform any of the steps of:
   determining the boundary model;
   determining, during movement of the cantilever, the actual position of the cantilever or portion thereof;
   determining, during movement of the cantilever, the difference between the actual position of the cantilever or portion thereof and the actual operational envelope of movement of the cantilever or portion thereof; and
   providing the output signal when the difference is below the predefined threshold value.

28. The control unit of claim 26, wherein the offshore platform is a jack-up platform or a self-elevating vessel.

29. The control unit of claim 26, wherein the boundary limiting elements are obstacles on the offshore platform or on or at the cantilever structure.

30. The control unit of claim 26, wherein the spatial boundary is in the form of a two-dimensional or three-dimensional map.

31. The control unit of claim 26, wherein the portion of the cantilever is a reference point of the cantilever.

* * * * *